United States Patent [19]

Raman

[11] 4,120,815

[45] Oct. 17, 1978

[54] POLYMERIC DEMULSIFIERS

[75] Inventor: Manjeri S. Raman, Houston, Pa.

[73] Assignee: Calgon Corporation, Pittsburgh, Pa.

[21] Appl. No.: 844,561

[22] Filed: Oct. 25, 1977

[51] Int. Cl.$^2$ ............................................. B01D 17/04
[52] U.S. Cl. .................................... 252/341; 252/344; 252/358; 526/295
[58] Field of Search ....................... 252/344, 341, 358; 526/295

[56] References Cited

U.S. PATENT DOCUMENTS

| | | | |
|---|---|---|---|
| 2,923,701 | 2/1960 | Schuller et al. | 526/291 |
| 3,284,393 | 11/1966 | Vanderhoff et al. | 260/29.6 |
| 3,316,181 | 4/1967 | Sackis | 252/344 |
| 3,585,148 | 6/1971 | Sackis | 252/344 |

*Primary Examiner*—Benjamin R. Padgett
*Assistant Examiner*—E. Suzanne Parr
*Attorney, Agent, or Firm*—Rudolph J. Anderson; Mario A. Monaco; Martin L. Katz

[57] ABSTRACT

Use of a blend of diallyl dimethyl ammonium chloride emulsion polymers to break oil-in-water emulsions in the waste streams at petroleum refineries, industrial plants and the like.

1 Claim, No Drawings

POLYMERIC DEMULSIFIERS

The instant invention relates to a method of resolving or separating emulsions of the oil-in-water type by chemical treatment. More specifically, the present invention is concerned with demulsifying oil-in-water emulsions by treating them with minor dosages of water-soluble cationic copolymers containing a quaternary moiety.

Oil-in-water emulsions are the type of emulsions which comprise organic oily materials which are distributed or dispersed as small drops throughout a continuous body of non-oily media. The organic oily materials which are immiscible with water or aqueous or non-oily media, in many instances form stable, difficulty separable emulsions. Often the amount of dispersed oily phase is minor in comparison to the aqueous or non-oily continuous phase, and is resistant to resolution.

An example of an economically important type of emulsion is one in which small proportions of petroleum or petroleum fractions are stably dispersed in water and/or brine non-oily continuous phases. It is essential to resolve this emulsion in order to recover the oily material substantially free of undesirable aqueous phase. Not only are emulsions found in areas of petroleum refining, but are also encountered in metal working industries, steel and aluminum rolling mills, chemical processing, food processing, and the like. Specifically, emulsions of oily matter in water or other non-oily environment are encountered in milk and mayonnaise processing, marine ballast water disposal, and furniture polish formulations. Often steam distillation and other techniques cause the above emulsions from which the valuable oil must be resolved and recovered.

It has been found that many oil-in-water emulsions can only be effectively broken with clean resolution of discontinuous and continuous phases, by treatment with large molecules such as long chain polymeric materials, and the present invention utilizes a novel class of water-soluble, water-in-oil emulsions cationic polymeric materials derived from acrylamide and quaternary compound of diallylamine.

A specific object of the invention is to provide a process of emulsion breaking by use of water-soluble high molecular weight copolymeric substances which have a wide range of applicability and are particularly effective in resolving oil-in-water emulsions of petroleum systems.

In accordance with the invention a successful method has been discovered for breaking emulsions of the type comprising an oil phase dispersed in a non-oily continuous phase such as water or such hydrophilic liquids as water-miscible alcohols, mixtures of same with water, etc. In this process it has been found that excellent separation of the oil and non-oil phases may be effected by treatment of the emulsion with at least a demulsifying amount of a copolymeric polyacrylamide demulsifier which has a plurality of a wide variety of strongly basic quaternary cationic groupings. After such chemical treatment of the emulsion, the respective phases may be rapidly resolved into distinct layers which are then separated by any number of well-known mechanical means such as merely drawing the heavier non-oily layer away from the lighter oil fraction through gravity separation means.

The prior art is represented by U.S. Pat. Nos. 3,316,181 and 3,585,148. U.S. Pat. No. 3,316,181 discloses the use of acrylamide-diallylamine copolymers for breaking emulsions of the oil-in-water type and U.S. Pat. No. 3,585,148 discloses the use of copolymers of acrylamide and dialkyl diallyl ammonium chloride compound for breaking emulsions of the oil-in-water type.

The compositions useful in my invention are blends of cationic and amphoteric water-in-oil emulsion polymers. The preferred blends consist essentially of 50 percent by weight of a cationic water-in-oil emulsion polymer and 50 percent by weight of an amphoteric water-in-oil emulsion polymer. The preferred cationic polymer is a terpolymer prepared by the polymerization of a monomer mixture of 50 percent by weight acrylamide, 47.5 percent by weight diallyl dimethyl ammonium chloride and 2.5 percent by weight diallyl diethyl ammonium chloride. The preferred amphoteric polymer is prepared from a monomer mixture of 47.8 percent by weight acrylamide, 2.2 percent by weight acrylic acid, 47.5 percent by weight diallyl dimethyl ammonium chloride and 2.5 percent by weight diallyl diethyl ammonium chloride.

The emulsion polymers useful in my invention are prepared by a water-in-oil emulsion polymerization process in which the monomers are emulsified in an oil phase containing at least 20 percent by weight, based on the oil phase, of an emulsifying agent and polymerized therein in order to obtain stable emulsion polymers that may be inverted upon addition to water.

The emulsifying agent may be any conventional water-dispersible emulsifying agent of mixtures thereof having an HLB of at least 7. The preferred surfactants include ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of high amines like lauryl amine hydrochloride and stearyl amine hydrobromide.

Any anionic, cationic, or nonionic compound can be used as the surfactant. Examples of suitable anionic surfactants are alkali metal, ammonium and amine soaps; the fatty acid part of such soaps contain preferably at least 16 carbon atoms because soaps based on lauric and myristic acids have a great tendency to develop abundant foam.

Other examples of suitable anionic surfactants are alkali metal salts of alkyl-aryl sulfonic acids, sodium dialkyl sulfosuccinate, sulfated or sulfonated oils, e.g., sulfated castor oil; sulfonated tallow and alkali salts of short chain petroleum sulfonic acids.

Examples of suitable cationic surfactants are salts of long chain primary, secondary, or tertiary amines, such as oleylamine acetate, cetylamine acetate, di-dodecylamine lactate, the acetate of aminoethyl-stearamide, dilauroyl triethylene tetraamine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable nonionic surfactants are condensation products of higher fatty alcohols with ethylene oxide, such as the reaction product of oleyl alcohol with 10 ethylene oxide units; condensation products of alkyl phenols with ethylene oxide, such as the reaction products of isoctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate, tricosaethyleneglycol dibehenate, polyhydric alcohol partial higher fatty acid esters such as sorbitan tristearate, ethylene oxide condensation products of polyhydric alcohol partial higher fatty esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate, reacted with 10 to 15 molecules of ethylene oxide; long chain polyglycols in which one hydroxyl group is esterified with a higher fatty acid and the other hydroxy group is etherified with a low molecular alcohol, such as methoxypolyethylene glycol 550 monostearate (550 meaning the average molecular weight of the polyglycol ether). A combination of two or more of these surfactants may be used; e.g., a cationic may be blended with a nonionic or an anionic with a nonionic.

Following is a list of suitable surfactants that could be used in the practice of this invention. Any water-dispersible surfactant could be used, but naturally some are more efficient than others. Useful surfactants include, but are not limited to, sorbitan sesquioleate, polyoxyethylene alkyl phenol, polyoxyethylene (10 mole) cetyl ether, polyoxyethylene alkylaryl ether, polyoxyethylene monolaurate, polyoxyethylene vegetable oil, polyoxyethylene sorbitan monolaurate, polyoxyethylene (40 mole) sorbitol hexaoleate, polyoxyethylene esters of mixed fatty and resin acids, polyoxyethylene sorbitol lanolin derivative, polyoxyethylene (12 mole) tridecyl ether, polyoxyethylene sorbitan esters of mixed fatty and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate. Prior art processes, as illustrated by U.S. Pat. No. 3,284,393, utilize significantly lower amounts of emulsifying agents and produce products that are less storage stable and have less freeze/thaw stability.

The oil phase may be any inert hydrophobic liquid. A preferred group of organic liquids are the hydrocarbon liquids which include both aromatic and aliphatic compounds. Thus, such organic hydrocarbon liquids as benzene, xylene, toluene, mineral oils, mineral spirits, kerosenes, naphthas and, in certain instances, petrolatums may be used. Preferred oils include Mentor 28, a high boiling parafinic mineral oil marketed by Exxon and Soltrol 200 and Soltrol 220, high boiling parafinic mineral oils marketed by Phillips Petroleum Company.

The amount of oil used in relation to the water to prepare the emulsion may be varied over wide ranges. As a general rule, the amount of water-to-oil may vary between 5:1 to 1:10 with the preferred amount of water-to-oil being in the ratio of 1:1 to 1:10. These ratios are illustrative of emulsions that can be prepared, although it should be understood that the invention is not limited thereby.

Any free radical initiators such as t-butyl peroxy pivalate, benzoyl peroxide, lauroyl peroxide, potassium and ammonium persulfate may be used in amounts ranging from about 0.0000001 to about 1 mole percent. Other mechanisms of initiation such as photolytic or thermal means may be used and still be within the scope of this invention.

The reaction may be carried out at temperatures of from about 0° C. to about 100° C. The preferred range, however, is from about 25° C. to about 75° C. The reaction also may be conducted under subatmospheric or superatmospheric conditions.

A typical procedure may be described as follows. The water-in-oil emulsifying agent is dispersed in the oil phase, while the free radical initiator, when one is used, is dissolved in the oil or monomer phase, depending upon whether an oil or water-soluble initiator is used. An aqueous solution of monomer or mixed monomers or monomer per se is then added to the oil phase with agitation until the monomer phase is emulsified in the oil phase, and the reaction is carried out as indicated above. The order of addition of reaction media ingredients is not important. The reaction is continued with agitation until conversion is substantially complete. A polymeric latex is thereby obtained. It should be noted that there are many variations of the aforementioned procedure that may be utilized. For example, an emulsion of the monomer may be formed and fed incrementally or continuously to a "heel" of the emulsion in the reactor. A batch process in which all components are combined initially is also a practical procedure.

The polymers used in my invention have molecular weights of at least 100,000, preferably at least 250,000. Normally, at least 10 ppm of polymer based on the weight of the emulsion, and preferably 20–40 ppm of polymer based on the weight of the emulsion, is used for most applications.

The invention may be illustrated by the following representative examples which compare the blend of 50 percent by weight of a cationic emulsion polymer of 50 percent by weight acrylamide, 47.5 percent by weight diallyl dimethyl ammonium chloride and 2.5 percent by weight diallyl diethyl ammonium chloride and 50 percent by weight of an amphoteric emulsion polymer of 47.8 percent by weight acrylamide, 2.2 percent by weight acrylic acid, 47.5 percent by weight diallyl dimethyl ammonium chloride and 2.5 percent by weight diallyl diethyl ammonium chloride.

EXAMPLE I

At a refinery, the oily waste water containing approximately 200–500 ppm of Hydrocarbon oil coming out of their API separators was treated with five commercially available cationic copolymers and the product of this invention, the blend of the cationic and amphoteric emulsion polymer. The evaluation was as follows:

A series of jar tests were run in the oily waste water to compare the performance of the commercially available cationic copolymers and the product of this invention. Each test was performed by adding the treating reagents as quickly as possible to waste water while stirring the water at 100 rpm. After the chemical was added, the treated waste water was agitated in the following sequence.

2 minutes at 100 rpm
5 minutes at 40 rpm
5 minutes at 0 rpm

The table below shows the results of flocculation and flotation or settling characteristics. The letter designations for various polymers are as follows:

A. An unhydrolyzed copolymer of, by weight, 75% diallyl dimethyl ammonium chloride and 25% acrylamide.
B. An unhydrolyzed terpolymer of, by weight, 70% acrylamide, 27.5% diallyl dimethyl ammonium chloride and 2.5% diallyl diethyl ammonium chloride.
C. An unhydrolyzed copolymer of, by weight, 95% diallyl dimethyl ammonium chloride and 5% acrylamide.
D. An unhydrolyzed homopolymer of diallyl dimethyl ammonium chloride.
E. The 50/50 blend of the cationic and amphoteric emulsion copolymers (product of the invention).
F. A condensation polyamine cationic polymer.

| Polymer | Dosage ppm | Floc Settling/Floating Characteristics | Supernatant Clarity |
|---|---|---|---|
| A | 5 | Good | Good |
| A | 10 | Good | Good |
| B | 5 | Fair | Fair |
| B | 10 | Good | Fair |
| C | 5 | Fair | Fair |
| C | 10 | Fair | Fair |
| D | 5 | Poor | Poor |
| D | 10 | Poor | Poor |
| E | 3 | Excellent | Excellent |
| E | 5 | Excellent | Excellent |
| E | 10 | Excellent | Excellent |
| F | 5 | Good | Good |
| F | 10 | Good | Good |

Note: Floc characteristics rating is based on the size of the floc, speed of formation and rising or settling rate.

EXAMPLE II

At another refinery, a dissolved Air Flotation Unit is employed to float the bugs out of the effluent from the biological treatment. A series of jar tests were run to evaluate the performance of several commercially available cationic polymers and the products of this invention, the blend of the cationic and amphoteric emulsion polymer. For this application, the evaluation was as follows:

A series of jar tests were run in the oily waste water to compare the performance of the commercially available cationic copolymers and the product of this invention. Each test was performed by adding the treating reagents as quickly as possible to waste water while stirring the water at 100 rpm. After the chemical was added, the treated waste water was agitated in the following sequence:

2 minutes at 100 rpm
5 minutes at 40 rpm
5 minutes at 0 rpm

The table below shows the results of flocculation and flotation or settling characteristics. The letter designations for various polymers are as follows:

A. An unhydrolyzed copolymer of, by weight, 75% diallyl dimethyl ammonium chloride and 25% acrylamide.
B. An unhydrolyzed terpolymer of, by weight, 70% acrylamide, 27.5% diallyl dimethyl ammonium chloride and 2.5% diallyl diethyl ammonium chloride.
C. An unhydrolyzed copolymer of, by weight, 95% diallyl dimethyl ammonium chloride and 5% acrylamide.
D. An unhydrolyzed homopolymer of diallyl dimethyl ammonium chloride.
E. The 50/50 blend of the cationic and amphoteric emulsion copolymers (product of the invention).
F. A condensation polyamine liquid cationic polymer.

| Polymer | Dosage ppm | Floc Settling/Floating Characteristics | Supernatant Clarity |
|---|---|---|---|
| A | 10 | Fair | Fair |
| A | 30 | Good | Good |
| B | 10 | Poor | Poor |
| B | 30 | Fair | Poor |
| C | 10 | Poor | Poor |
| C | 30 | Poor | Poor |
| D | 10 | Poor | Poor |
| D | 30 | Poor | Poor |
| E | 10 | Good | Good |
| E | 15 | Good | Good |
| E | 20 | Excellent | Excellent |
| F | 20 | Good | Fair |
| F | 30 | Good | Good |

Note: Floc characteristics rating is based on the size of the floc, speed of formation and the rate of rise or settling.

EXAMPLE III

At a waste treatment plant, waste water containing soluble oil is treated in the Dissolved Air Flotation Unit using chemical flotation aids. Several commercially cationic polymers were evaluated along with the product of this invention, a blend of the cationic and amphoteric emulsion polymers, for this application. Both polymer and alum were required for floating the oil. The evaluation was as follows:

A series of jar tests were run in the oily waste water to compare the performance of the commercially available cationic copolymers and the product of this invention. Each test was performed by adding the treating reagents as quickly as possible to waste water while stirring the water at 100 rpm. After the chemical was added, the treated waste water was agitated in the following sequence:

2 minutes at 100 rpm
5 minutes at 40 rpm
5 minutes at 0 rpm

The table below shows the results of flocculation and flotation or settling characteristics. The letter designations for various polymers are as follows:

A. An unhydrolyzed copolymer of, by weight, 75% diallyl dimethyl ammonium chloride and 25% acrylamide.
B. An unhydrolyzed terpolymer of, by weight, 70% acrylamide, 27.5% diallyl dimethyl ammonium chloride and 2.5% diallyl diethyl ammonium chloride.
C. An unhydrolyzed copolymer of, by weight, 95% diallyl dimethyl ammonium chloride and 5% acrylamide.

D. An unhydrolyzed homopolymer of diallyl dimethyl ammonium chloride.
E. The 50/50 blend of the cationic and amphoteric emulsion copolymers (product of the invention).
F. A condensation polyamine cationic polymer.

| Polymer | Dosage ppm | Floc Settling/Floating Characteristics | Supernatant Clarity |
| --- | --- | --- | --- |
| A | 40 | Poor | Poor |
| A | 60 | Poor | Poor |
| B | 40 | Poor | Poor |
| B | 60 | Poor | Poor |
| C | 40 | Poor | Poor |
| C | 60 | Poor | Poor |
| D | 40 | Fair | Fair |
| D | 60 | Good | Good |
| E | 20 | Good | Good |
| E | 30 | Excellent | Excellent |
| F | 40 | Good | Good |
| F | 60 | Excellent | Excellent |

Note:
1. All of the above tests were run with 80 ppm of alum.
2. The floc characteristics rating B are based on the size of the floc, speed of formation and settling in using rate.

EXAMPLE IV

At the same waste treatment plant, the waste water containing soluble oil is treated in the Dissolved Air Flotation Cell using chemical flotation aids. Several cationic polymers were evaluated along with the product of this invention, a blend of the cationic and amphoteric emulsion polymers for this application. Both polymers and alum were required for breaking this emulsion of soluble oil in water. The evaluation was as follows:

A series of jar tests were run in the oily waste water to compare the performance of the commercially available cationic copolymers and the product of this invention. Each test was performed by adding the treating reagents as quickly as possible to the waste water while stirring the water at 100 rpm. After the chemical was added, the treated waste water was agitated in the following sequence:

2 minutes at 100 rpm
5 minutes at 40 rpm
5 minutes at 0 rpm

The table below shows the results of flocculation and flotation or settling characteristics. The letter designations for various polymers are as follows:

A. An unhydrolyzed copolymer of, by weight, 75% diallyl dimethyl ammonium chloride and 25% acrylamide.
B. An unhydrolyzed terpolymer of, by weight, 70% acrylamide, 27.5% diallyl dimethyl ammonium chloride and 2.5% diallyl diethyl ammonium chloride.
C. An unhydrolyzed copolymer of, by weight, 95% diallyl dimethyl ammonium chloride and 5% acrylamide.
D. An unhydrolyzed homopolymer of diallyl dimethyl ammonium chloride.
E. The 50/50 blend of the cationic and amphoteric emulsion polymers (product of the invention).

| Polymer | Dosage ppm | Floc Settling/Floating Characteristics | Supernatant Clarity |
| --- | --- | --- | --- |
| A | 50 | Poor | Poor |
| A | 100 | Poor | Poor |
| A | 150 | Fair | Fair |
| B | 50 | Poor | Poor |
| B | 100 | Poor | Poor |
| B | 150 | Poor | Poor |
| C | 50 | Poor | Poor |
| C | 100 | Poor | Poor |
| C | 150 | Poor | Poor |
| D | 50 | Poor | Poor |
| D | 100 | Fair | Fair |
| D | 150 | Fair | Fair |
| E | 50 | Fair | Fair |
| E | 75 | Good | Fair |
| E | 150 | Good | Good |

Note:
1. All of the above tests were run with alum at 200 ppm.
2. The floc characteristics rating is based on the size of the floc, speed of formation and settling or rising rate.

EXAMPLE V

At a refinery, tanker ballast water containing hydrocarbon contaminants is treated in the induced air flotation unit using chemical flotation aids. Several polyelectrolytes were evaluated for this application along with the product of this invention, the blend of the cationic and amphoteric emulsion polymers. The evaluation was as follows:

A series of flotation tests were run using Wemco's Dupurator Test Kit. To three liters of the oily waste water approximate dosage of the polymer was added and mixed for one minute using the variation speed agitator in the bench Dupurator Kit. At the end of 2 minutes, the aerator was turned on for 4 minutes. The oily scum was removed from the top of the surface using a paint brush.

At the end of 4 minutes, the water was allowed to settle for 5 minutes. The samples were drawn from the bottom of the three liter glass container for comparison.

The table below shows the results of flocculation and flotation or settling characteristics. The letter designations for various polymers are as follows:

A. An unhydrolyzed copolymer of, by weight, 75% diallyl dimethyl ammonium chloride and 25% acrylamide.
B. An unhydrolyzed terpolymer of, by weight, 70% acrylamide, 27.5% diallyl dimethyl ammonium chloride and 2.5% diallyl diethyl ammonium chloride.
C. An unhydrolyzed copolymer of, by weight, 95% diallyl dimethyl ammonium chloride and 5% acrylamide.
D. An unhydrolyzed homopolymer of diallyl dimethyl ammonium chloride.
E. The 50/50 blend of the cationic and amphoteric emulsion polymers (product of the invention).

| Polymer | Dosage ppm | Floc Settling/Floating Characteristics | Supernatant Clarity |
| --- | --- | --- | --- |
| A | 5 | Fair | Fair |
| A | 15 | Good | Good |
| A | 20 | Good | Good |
| A | 30 | Good | Fair |
| B | 5 | Poor | Poor |
| B | 10 | Fair | Fair |
| B | 15 | Fair | Fair |
| C | 5 | Poor | Poor |
| C | 10 | Poor | Poor |
| C | 15 | Fair | Fair |
| D | 10 | Fair | Fair |
| D | 15 | Fair | Fair |
| E | 5 | Fair | Good |
| E | 10 | Good | Good |

-continued

| Polymer | Dosage ppm | Floc Settling/Floating Characteristics | Supernatant Clarity |
| --- | --- | --- | --- |
| E | 15 | Good | Good |

Note: The float characteristics rating is based on the size of the floc, the rising rate and the speed of formation.

I claim:

1. A method of breaking oil-in-water emulsions which comprise the steps of treating the emulsion with at least a demulsifying amount of a blend of about 50 weight percent of a cationic water-in-oil emulsion polymer which is prepared by the polymerization of a monomer mixture of 50 percent by weight acrylamide, 47.5 percent by weight diallyl dimethyl ammonium chloride, 2.5 percent by weight diallyl diethyl ammonium chloride and about 50 percent by weight of a water-in-oil amphoteric emulsion polymer which is prepared from a monomer mixture of 47.8 by weight acrylamide, 2.2 percent by weight acrylic acid, 47.5 percent by weight diallyl dimethyl ammonium chloride and 2.5 percent by weight diallyl diethyl ammonium chloride.

* * * * *